United States Patent
Bilinski et al.

[15] 3,700,289

[45] Oct. 24, 1972

[54] FLEXURE HINGE ASSEMBLY

[72] Inventors: Donald J. Bilinski, Randolph Township, Dover County, N.J.; Leon Weisbord, New York, N.Y.

[73] Assignee: The Singer Company, New York, N.Y.

[22] Filed: April 15, 1970

[21] Appl. No.: 28,592

[52] U.S. Cl............................308/2 A, 74/5 F, 287/85
[51] Int. Cl............................F16c 11/12, G01c 19/18
[58] Field of Search ..308/2 A; 74/5; 248/358; 64/11, 64/15; 287/85

[56] References Cited

UNITED STATES PATENTS

| | | |
|---|---|---|
| 3,575,475 | 4/1971 | Boerner............................74/5 |
| 3,585,866 | 6/1971 | Ensinger............................74/5 |
| 2,960,302 | 11/1960 | Brown............................74/5 X |
| 3,301,073 | 1/1967 | Howe............................74/5 X |
| 2,937,053 | 5/1960 | Rigney............................308/2 A |
| 3,246,890 | 4/1966 | Ormond............................248/358 X |
| 3,288,541 | 11/1966 | Tracy............................308/2 A |
| 3,354,726 | 11/1967 | Krupick et al..................74/5 |
| 3,420,582 | 1/1969 | Shelley............................287/85 X |

*Primary Examiner*—Manuel A. Antonakas
*Attorney*—S. A. Giarratana, Thomas W. Kennedy and S. Michael Bender

[57] ABSTRACT

A flexure hinge assembly wherein a pair of fixed telescoped tubular members are provided, each having one or more pairs of axially spaced slots extending through their walls, the ends of one slot of each pair terminating a predetermined circumferential distance from the corresponding ends of the other slot of the same pair to form at least two flexure portions between the ends. The flexure portions of one of the tubular members extend parallel to the axes of the members, and the flexure portions of the other tubular member extend perpendicular to the axes of the members. A method of manufacturing a flexure hinge assembly.

6 Claims, 11 Drawing Figures

INVENTORS:
DONALD J. BILINSKI
LEON WEISBORD
ATTORNEYS

INVENTOR
DONALD J. BILINSKI &
LEON WEISBORD

INVENTOR
DONALD J. BILINSKI &
LEON WEISBORD

BY
ATTORNEY

Patented Oct. 24, 1972
3,700,289
5 Sheets-Sheet 5
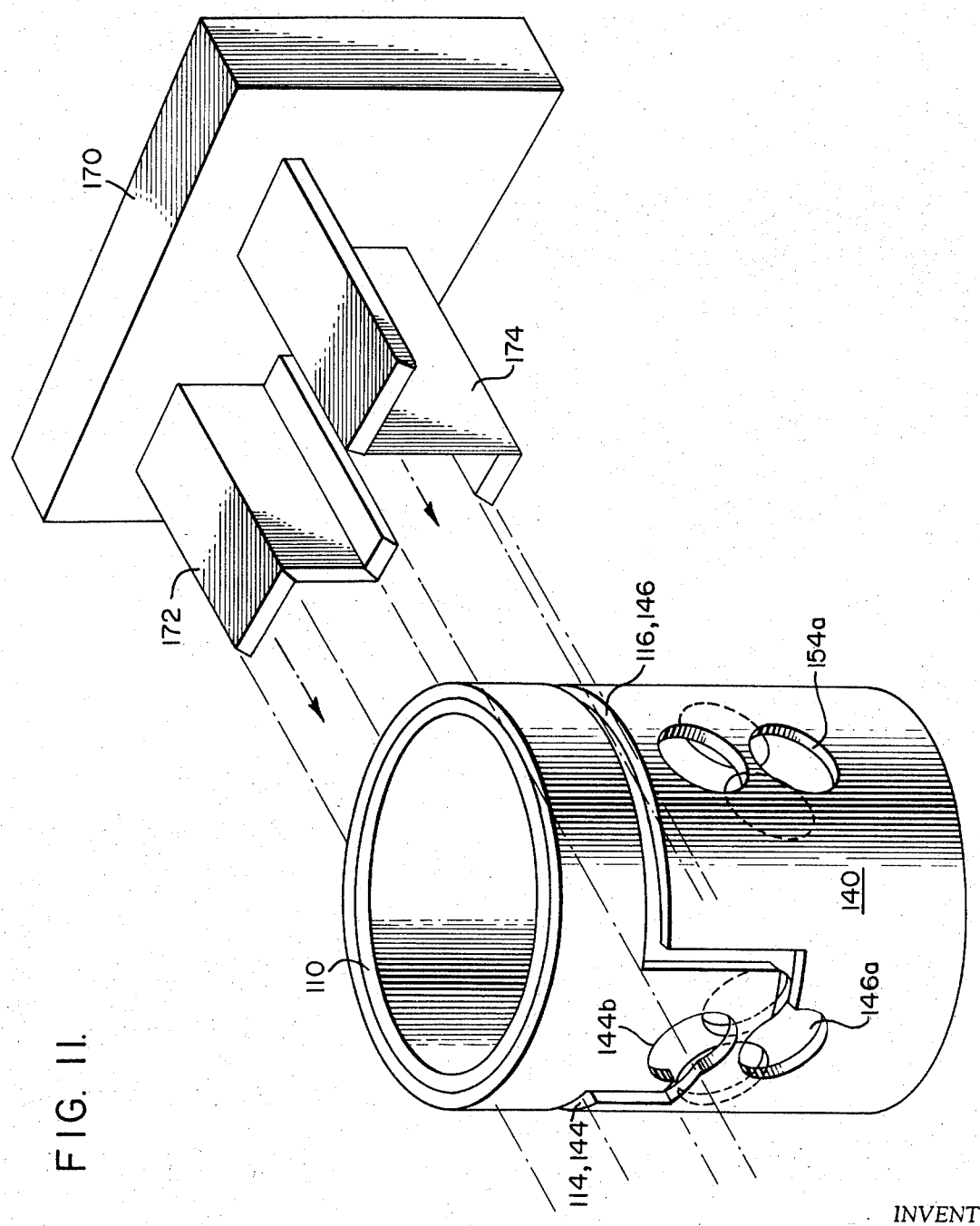
FIG. II.
INVENTOR
DONALD J. BILINSKI &
LEON WEISBORD
BY
S. A. Giarratana
ATTORNEY 3,700,289

FLEXURE HINGE ASSEMBLY

BACKGROUND OF THE INVENTION

This invention relates to a flexure hinge assembly, and, more particularly, to such an assembly for connecting two rotary members while permitting universal movement between them.

Several proposals have been made for a flexure joint extending between a driven member, such as a flywheel, or the like, and its drive shaft, so that the former may be rotationally torqued by the latter, and yet be essentially free of spring restraints for a predetermined range of angular deflections between the two members. For example, in U.S. Pat. No. 3,354,726, by W. J. Krupick and R. F. Cimera, and assigned to the assignee of the present invention, an inner hinge unit is concentrically disposed within an outer hinge unit, with the assembly thus formed having two pair of oppositely disposed flexure bars which permit universal tilting between the upper portion and the lower portion of the assembly. One of the hinge units has its flexure bars oriented in a manner to contribute high axial strength along the spin axis of the flywheel, and the other unit has its flexure bars positioned so as to provide the necessary radial and torsional stiffness. However, during manufacture of the assembly, the thin flexure sections in each unit are formed by machining four equally spaced pair of separated "blind" holes in the outside walls of a hollow cylindrical work piece. The work piece is divided into three gimbal portions while making appropriately shaped slots in the wall of the assembly thus formed, thus freeing each gimbal for angular displacement about its respective flexure axis. However, this cutting of the blind holes is extremely difficult, especially due to the fact that the delicate thin flexure sections in each hinge unit are easily ruptured, or overstressed, during assembly since no limit stops are provided to restrict the angular displacement of the respective gimbals. Therefore, due to the machining of these blind holes, it is necessary to position the inner and outer hinge units by resorting to the use of external reference surfaces. As a result, slight misalignment in the flexure axes of the two hinge units frequently occurs in production, leading to the introduction of excessive and unsymmetrical spring rates in the finished gyroscope. Further, the formation of the flexure bars in the above manner results in the latter having a non-uniform thickness across their respective bending axes, leading to further anormalization in the hinge assembly spring rates.

SUMMARY OF THE INVENTION

It is, therefore, an object of the present invention to provide an improved gyroscope flexure hinge assembly which may be manufactured in a simpler manner than the prior art hinge assemblies, yet with greater accuracy of finish.

Towards the fulfillment of this object, the flexure hinge assembly of the present invention comprises a flexure hinge assembly comprising a pair of fixed telescoped tubular members, each having at least two pairs of slots extending through the wall thereof, the slots of one pair being axially spaced from the slots of the other pair to form at least three gimbal portions in each member, the ends of one slot of each pair of one of said members terminating a predetermined circumferential distance from the corresponding ends of the other slot of the same pair to form at least two flexure portions between said ends, said flexure portions extending parallel to the axes of said members, the ends of one slot of each pair of the other of said members terminating a predetermined axial distance from the corresponding ends of the other slot of the same pair to form at least two additional flexure portions between said ends, said additional flexure portions extending perpendicular to said axes.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings:

FIG. 11 is a perspective view of the assembly of FIGS. 6-10 along with a cutter tool utilized in the manufacture of the assembly.

DESCRIPTION OF THE PREFERRED EMBODIMENTS

Figure 1:
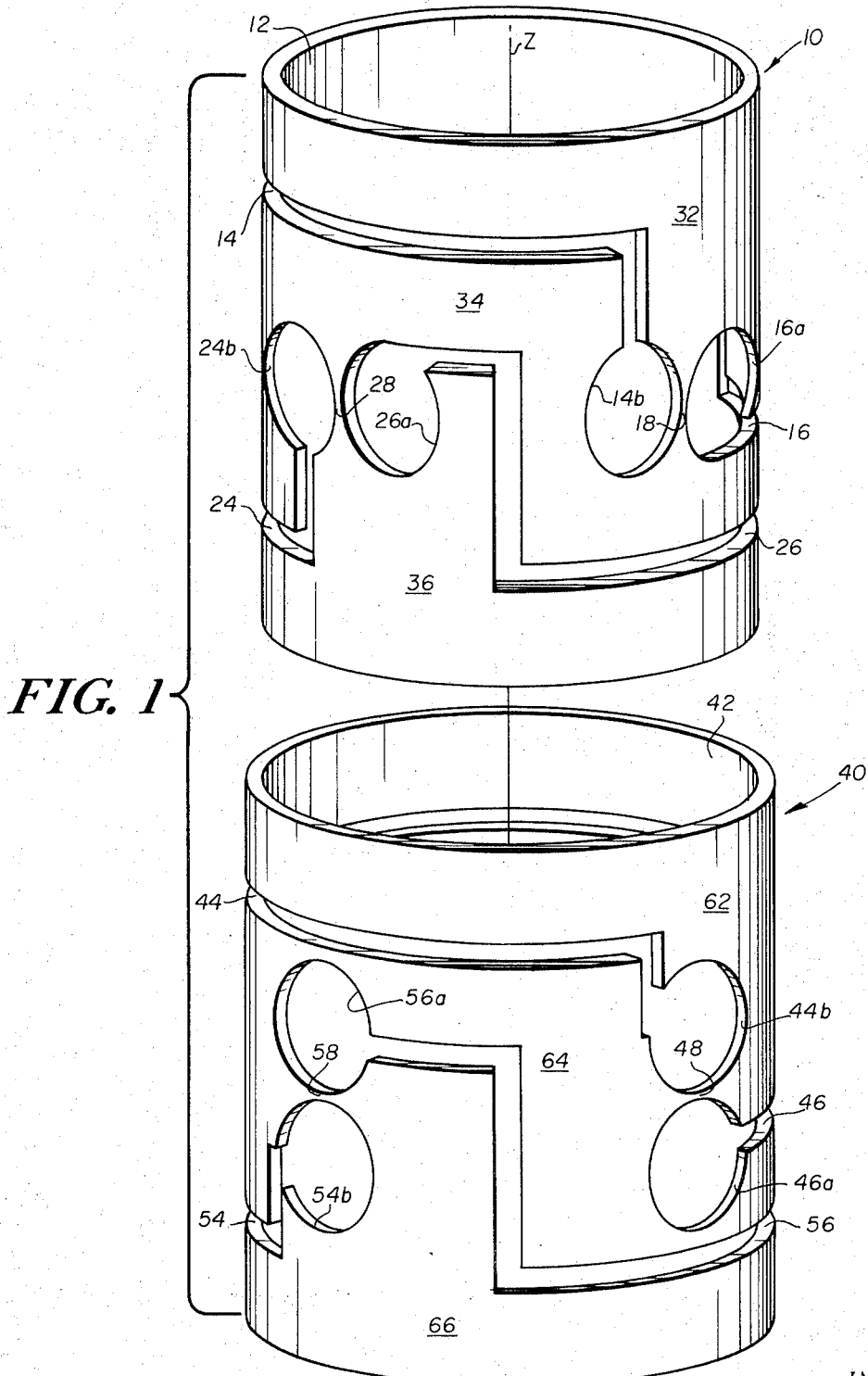
FIG. 1 is an enlarged exploded perspective view depicting the hinge members which together make up the hinge assembly of the present invention.
Figure 2:
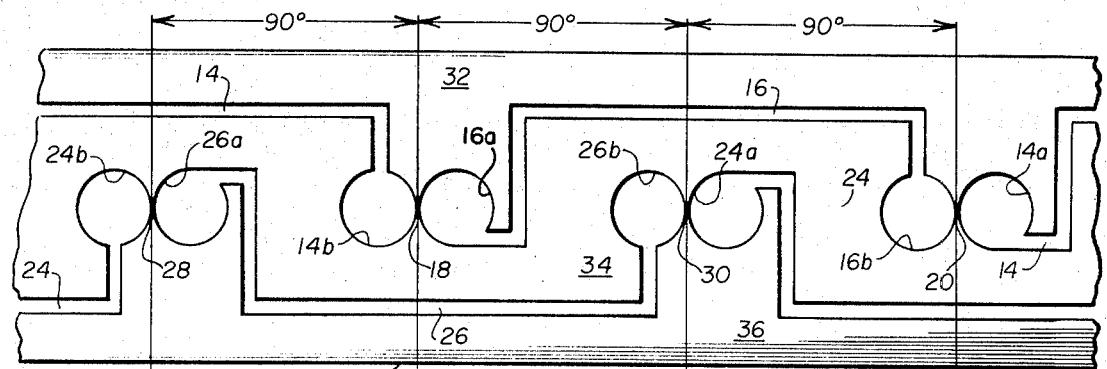
FIGS. 2 and 3 are developed views, depicting the inner hinge unit and the outer hinge unit, respectively.
Figure 3:
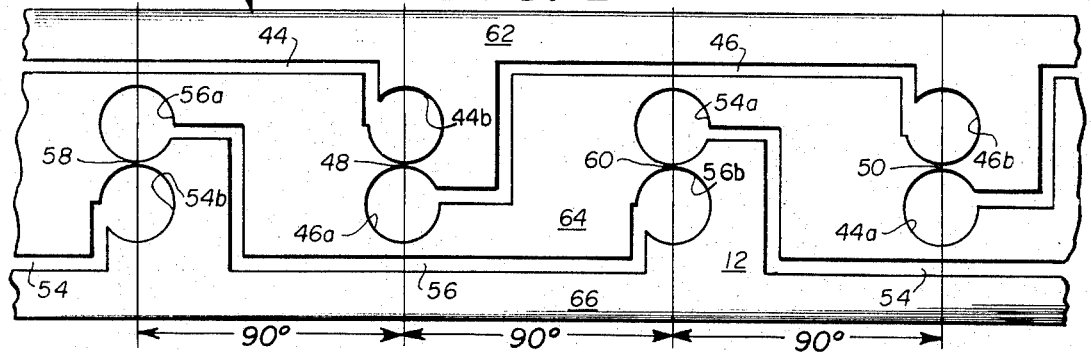

Referring specifically to FIGS. 1-3 of the drawings, the flexure hinge assembly of the present invention includes an inner hinge unit 10 and an outer hinge unit 40. Although the units 10 and 40 are shown axially separated in FIG. 1 for the convenience of presentation, they are normally telescoped, one within the other in a concentric manner about a principal axis Z.

As shown in FIGS. 1 and 2, the inner hinge unit 10 is in the form of a right circular cylinder, or tubular member, having a central bore 12 and a pair of generally circumferential extending slots 14 and 16. These slots are generally U-shaped, as better shown in FIG. 2, and an enlarged, radially extending bore, of a diameter exceeding the width of the slots, is formed at the ends of each slot. In particular, bores 14a and 14b are formed at the ends of the slot 14, and bores 16a and 16b are formed at the ends of the slot 16. The bores 14b and 16a are spaced apart slightly to form a necked-down flexure portion 18, and the bores 16b and 14a are spaced slightly apart to form a necked-down flexure portion 20, the flexure portions 18 and 20 extending parallel to the axis Z.

An additional pair of slots 24 and 26 are formed through the inner hinge member 10 in an axially spaced relation to the slots 14 and 16. The slots 24 and 26 are also generally U-shaped, are inverted with respect to the slots 14 and 16, and each has a bore formed at its ends. In particular, bores 24a and 24b are formed at the ends of the slot 24, while bores 26a and 26b are formed at the ends of the slot 26. The bores 24b and 26a are spaced slightly apart to form a necked-down flexure portion 28, and the bores 26b and 24a are spaced slightly apart to form a necked-down flexure portion 30. As in the case of the flexure portions 18 and 20, the flexure portions 28 and 30 extend parallel to the axis Z.

It is noted from an inspection of FIG. 2 that the flexure portions 18, 20, 28 and 30 are spaced at 90° intervals around the circumference of the inner hinge unit 10, with the slot 14 overlapping the flexure portion 28, the slot 16 overlapping the flexure portion 30, the slot 24 overlapping the flexure portion 20, and the slot 26 overlapping the flexure portion 18.

In this manner, three gimbal portions 32, 34 and 36 are formed as a result of the above slots, with the flexure portions 18, 20 28 and 30 permitting flexing between the middle gimbal portion 34 with respect to each of the other gimbal portions 32 and 36, while providing strength in the axial direction of the unit 10.

The outer hinge unit 40 is shown in FIGS. 1 and 3, and is similar to the inner hinge unit 10 with the exception that the flexure portions formed in connection with the former extend in a direction perpendicular to the axis Z. Particularly, a pair of slots 44 and 46 are provided through the wall of the unit 40, are generally U-shaped and have bores 44a, 44b, and 46a, 46b, respectively, formed at the ends thereof. The bores 44b and 46a are spaced apart in the axial direction of the unit to define a flexure portion 48, and the bores 46b and 44a are spaced apart in the same direction to define a flexure portion 50.

An additional pair of slots 54 and 56 are formed through the hinge unit 40 and are axially spaced from the slots 44 and 46. These slots are also generally U-shaped and are inverted with respect to the slots 44 and 46. Bores 54a and 54b are formed at the ends of the slot 54, and bores 56a and 56b are formed at the ends of the slot 56, the bores 56a and 54b being spaced apart in the axial direction of the unit to define a flexure portion 58, and the bores 54a and 56b being spaced apart in the same direction to define a flexure portion 60. The flexure portions 48, 50, 58 and 60 thus extend in a direction perpendicular to the axis Z.

As in the case of the unit 10, the flexure portions 48, 50, 58 and 60 are spaced apart at 90° intervals, and the slot 44 overlaps the flexure portion 58, the slot 46 overlaps the flexure portion 60, the slot 54 overlaps the flexure portion 50, and the slot 56 overlaps the flexure portion 48.

Three gimbal portions 62, 64 and 66 are formed by the slots 44, 46, 54 and 56, and the flexure portions 48, 50, 58 and 60 permit relative flexing movement between the middle gimbal portion 64 and each of the other gimbal portions 62 and 66.

Figure 4:
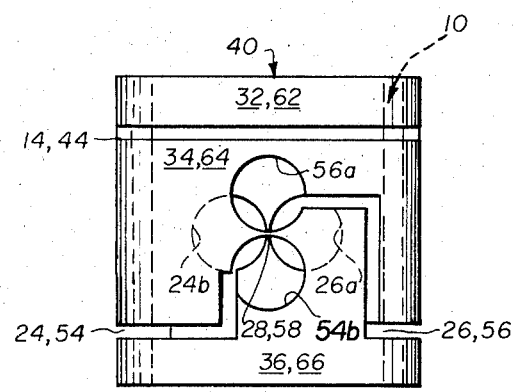
FIGS. 4 and 5 are a front elevational view, and a side elevational view, respectively, depicting the assembled hinge assembly of the present invention.
Figure 5:
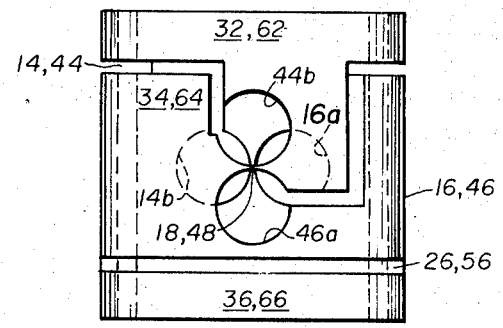

The inner hinge unit 10 is shown assembled within the outer hinge unit 40 in FIGS. 4 and 5, with the slot 14 in alignment with the slot 44, the slot 16 in alignment with the slot 46, the slot 24 in alignment with the slot 54, and the slot 26 in alignment with the slot 56. Since the gimbal portion 32 of the unit 10 is substantially coextensive with the gimbal portion 62 of the unit 40, the gimbal portion 34 is substantially coextensive with the gimbal portion 64, and the gimbal portion 36 is substantially coextensive with the gimbal portion 66, three gimbal portions of double thickness are thus formed.

In manufacture, the hinge units 10 and 40 are machined to their appropriate sizes and the various bores drilled therethrough. Then the inner hinge unit 10 is placed within the outer hinge unit 40 with their bores in their proper position and the units are bonded together in a conventional manner such as by electron beam welding, cementing, etc., along one or more circumferential joints. The slots 14 and 44 are then cut through the units 10 and 40, respectively, by a single cut and the remaining slots 16 and 46, 24 and 54, and 26 and 56 are cut in a similar manner. For specific details of this manufacturing technique, reference is made to application, Ser. No. 759,302 and Ser. No. 838,100 both by Willis B. Ensinger, and both assigned to the assignee of the present invention.

In the embodiment of FIGS. 6–10 an inner hinge unit 110 and an outer hinge unit 140 are provided, which are similar in shape to the hinge units 10 and 40, respectively, of the previous embodiment. A pair of generally U-shaped, circumferential extending slots 14 and 16 are formed through the inner hinge unit 110, as better shown in FIG. 7, and an enlarged, radially extending bore, of a diameter exceeding the width of the slots, is formed at the ends of each slot. In particular, bores 114a and 114b are formed at the ends of the slot 114, and bores 116a and 116b are formed at the ends of the slot 116. The bores 114b and 116a are spaced apart slightly to form a necked-down flexure portion 118, and the bores 116b and 114a are spaced slightly apart to form a necked-down flexure portion 120, the flexure portions 118 and 120 extending parallel to the axis Z.

An additional pair of slots 124 and 126 are formed through the inner hinge member 110 in an axially spaced relation to the slots 114 and 116. The slots 124 and 126 are also generally U-shaped, are inverted with respect to the slots 114 and 116, and each has a bore formed at its ends. In particular, bores 124a and 124b are formed at the ends of the slot 124, while bores 126a and 126b are formed at the ends of the slot 126. The bores 124b and 126a are spaced slightly apart to form a necked-down flexure portion 128, and the bores 126b and 124a are spaced slightly apart to form a necked-down flexure portion 130. As in the case of the flexure portions 118 and 120, the flexure portions 128 and 130 extend parallel to the axis Z.

Figure 7:
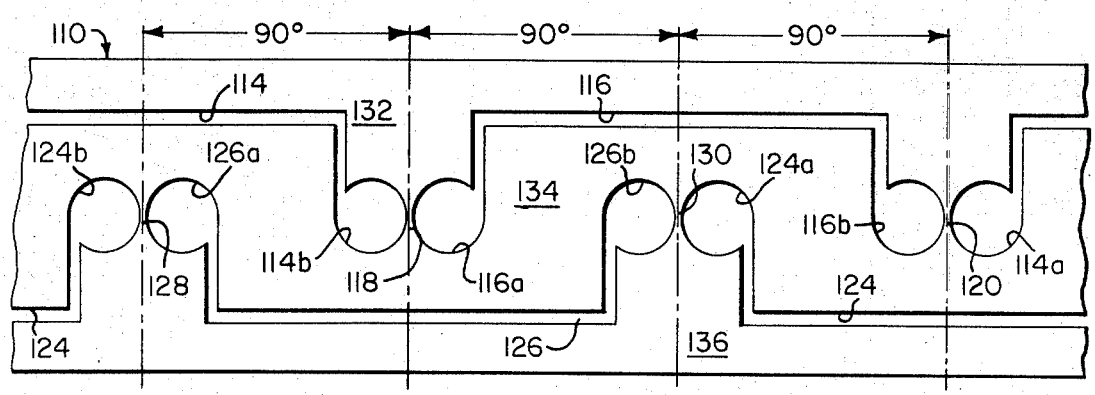

It is noted from an inspection of FIG. 7 that the flexure portions 118, 120, and 130 are spaced at 90° intervals around the circumference of the inner hinge unit 110, with the slot 114 overlapping the flexure portion 128, the slot 116 overlapping the flexure portion 130, the slot 124 overlapping the flexure portion 120, and the slot 126 overlapping the flexure portion 118.

In this manner, three gimbal portions 132, 134 and 136 are formed as a result of the above slots, with the flexure portions 118, 120, 128 and 130 permitting flexing between the middle gimbal portion 134 with respect to each of the other gimbal portions 132 and 136, while providing strength in the axial direction of the unit 110.

Figure 6:
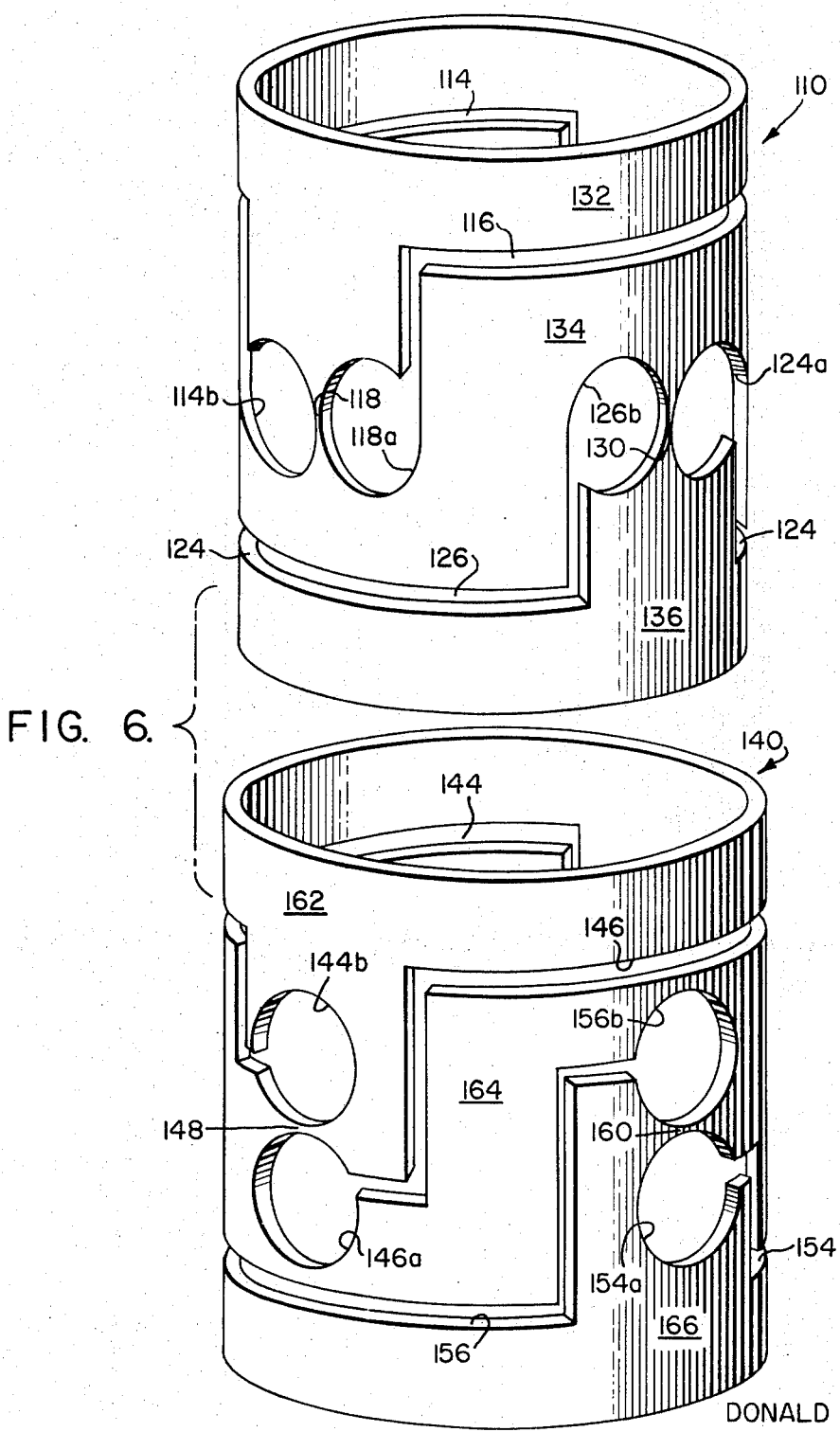
FIGS. 6-10 are views similar to FIGS. 1-5, respectively, but depicting another embodiment of the present invention.
Figure 8:
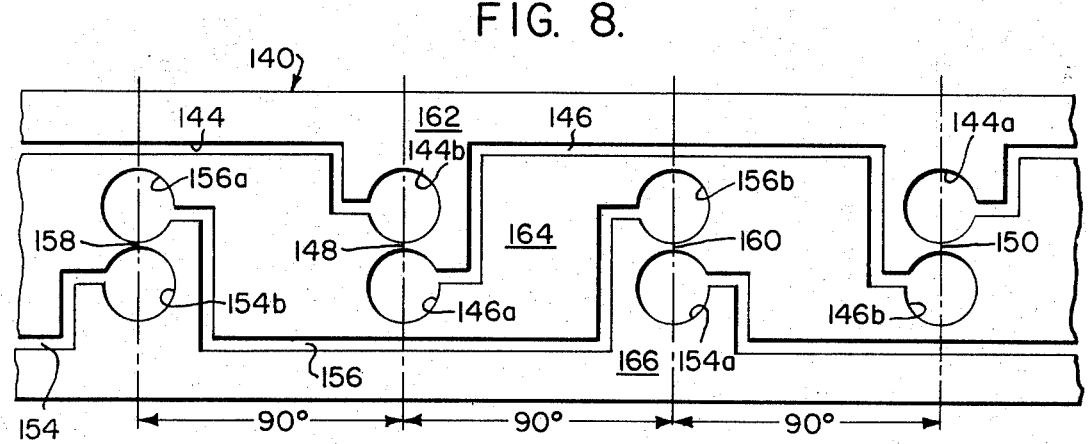

The outer hinge unit 140 is shown in FIGS. 6 and 8, and is similar to the inner hinge unit 110 with the exception that the flexure portions formed in connection with the former extend in a direction perpendicular to the axis Z. Particularly, a pair of slots 144 and 146 are provided through the wall of the unit 140, are generally U-shaped and have bores 144a, 144b, and 146a, 146b, respectively, formed at the ends thereof. The bores 144b and 146a are spaced apart in the axial direction of the unit to define a flexure portion 148, and the bores 146b and 144a are spaced apart in the same direction to define a flexure portion 150.

An additional pair of slots 154 and 156 are formed through the hinge unit 140 and are axially spaced from the slots 144 and 146. These slots are also generally U-shaped and are inverted with respect to the slots 144 and 146. Bores 154a and 154b are formed at the ends of the slot 154, and bores 156a and 156b are formed at the ends of the slot 156, the bores 156a and 154b being spaced apart in the axial direction of the unit to define a flexure portion 158, and the bores 154a and 156b being spaced apart in the same direction to define a flexure portion 160. The flexure portions 148, 150, 158 and 160 thus extend in a direction perpendicular to the axis Z.

As in the case of the unit 110, the flexure portions 148, 150, 158, and 160 are spaced apart at 90° intervals, and the slot 144 overlaps the flexure portion 158, the slot 146 overlaps the flexure portion 160, the slot 154 overlaps the flexure portion 150, and the slot 156 overlaps the flexure portion 148.

Three gimbal portions 162, 164 and 166 are formed by the slots 144, 146, 154 and 156, and the flexure portions 148, 150, 158 and 160 permit relative flexing movement between the middle gimbal portion 164 and each of the other gimbal portions 162 and 166.

Figure 9:
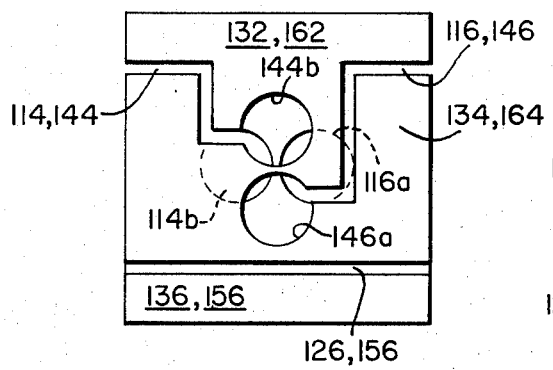
Figure 10:
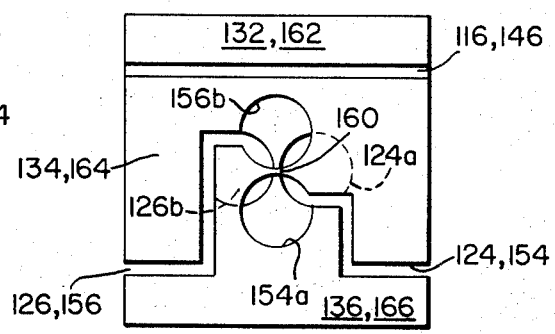

The inner hinge unit 110 is shown assembled within the outer hinge unit 140 in FIGS. 9 and 10, with the slot 114 in alignment with the slot 144, the slot 116 in alignment with the slot 146, the slot 124 in alignment with the slot 154, and the slot 126 in alignment with the slot 156. Since the gimbal portion 132 of the unit 110 is substantially coextensive with the gimbal portion 162 of the unit 140, the gimbal portion 134 is substantially coextensive with the gimbal portion 164, and the gimbal portion 136 is substantially coextensive with the gimbal portion 166, three gimbal portions of double thickness are thus formed.

The assembly of FIGS. 6–10 is manufactured by a method described in connection with FIG. 11 of the drawings. In particular, the tubular members 110 and 140, which have been previously ground and finished to form the various holes therethrough, are telescoped one within the other and fixed together, as shown in FIG. 11. The telescoped tubular members 110 and 140 are mounted with respect to a work bench or the like and a base member 170 carrying a pair of tools 172 and 174 is advanced relative to the tubular members in the direction indicated by the arrows. The details of the work bench, the mounting assembly for the base member, and the mechanism utilized to effect the above advancement is not shown in detail for the convenience of presentation.

The blades of each of the tools 172 and 174 extend in three planes as shown so that, upon passage of the tools through the tubular members 110 and 140 corresponding cuts are made through the tubular members to form the slots 114, 144 and 116, 146.

The base member 170, along with the tools 172 and 174, is then withdrawn and indexed 180° about the longitudinal axis of the base member so that the tools are turned upside down from the position of FIG. 11. The telescoped tubular members 110 and 140 are indexed 90° and the base member 170 advanced towards the assembly in the foregoing manner, whereby the slots 124, 154 and 126, 156 are cut.

It can be appreciated that this method of manufacture is extremely simple since relatively complex slots are formed by using only two cutters making two separate passes through the assembly.

As mentioned earlier, the flexure hinge assembly of each of the above embodiments is adapted to serve as a connective and supportive link between an inertial flywheel and a drive shaft therefor to form an effective gyroscope. In particular, the drive shaft is directly coupled to one end of the assembly and the flywheel is connected to the other end of the assembly, it being understood that these connections may be made in any known manner such as by welding, bolting, etc.

In operation, rotation of the drive shaft will cause the entire assembly to rotate about the axis Z, thereby transferring angular momentum to the flywheel. The assembly permits universal tilting of the flywheel about any transverse axis normal to the axis Z, while the flexure portions of the inner hinge units 10 and 110 provide support in tension or compression against all axial loads imposed on the flywheel. In a similar manner, the flexure portions of the outer hinge units 40 and 140 provide support in tension or compression against radial and/or torsional loads imposed upon the flywheel.

Of course, variations of the specific construction and arrangement of the assembly disclosed above can be made by those skilled in the art without departing from the invention as defined in the appended claims.

We claim:

1. A flexure hinge assembly comprising a pair of fixed telescoped tubular members, each said member having a longitudinal axis and a pair of transverse axes arranged in quadrature and intersecting at a common pivot point, said corresponding axes of said members being aligned, said pivot points of said members being coincident, each said member having at least two pairs of slots extending through the wall thereof, the slots of one pair being axially spaced from the slots of the other pair to form at least three gimbal portions in each member, said gimbal portions including an upper gimbal portion and a lower gimbal portion and a middle gimbal portion, said middle gimbal portion connected to said upper and lower gimbal portions, a bore being formed through the wall of each of said members at each end of each of said slots, the bores at the ends of one slot of each pair of one of said members terminating a predetermined circumferential distance from the corresponding bores at the ends of the other slot of the same pair to form at least two flexure portions between said bores, said flexure portions extending parallel to the longitudinal axes of said members, the bores at the ends of one slot of each pair of the other of said members terminating a predetermined axial distance from the corresponding bores at the ends of the other slot of the same pair to form at least two additional flexure portions between said bores, said additional flexure portions extending perpendicular to said longitudinal axes, wherein said middle gimbal portions of said members have respective centers of gravity said centers of gravity being arranged to substantially coincide with each other and with said coincident pivot points.

2. The assembly of claim 1 wherein each slot of one of said members is aligned with a corresponding slot of the other member, and wherein each gimbal portion of one of said members is substantially coextensive with a gimbal portion of the other member.

3. The assembly of claim 2 wherein a portion of each flexure portion of one of said members overlies a portion of a corresponding flexure portion of the other of said members.

4. The assembly of claim 1 wherein one of said gimbal portions of each of said members is connected between the other of said gimbal portions by means of said flexure portions.

5. The assembly of claim 1 wherein said flexure portions lie in a common plane extending transverse to the axes of said members.

6. The flexure joint of claim 1 wherein the combined arcuate lengths of the slots of each pair along with their corresponding bores and flexure portions extend for substantially one circumference of their respective tubular member.

* * * * *